Jan. 20, 1942.  E. H. LAND ET AL  2,270,323
POLYVINYL ALCOHOL HAVING HIGH BIREFRINGENCE
Filed May 4, 1939

Highly Birefringent Polyvinyl Alcohol

INVENTORS
Edwin H. Land and
Cutler D. West
BY
Brown & Jones
ATTORNEYS

UNITED STATES PATENT OFFICE 2,270,323

POLYVINYL ALCOHOL HAVING HIGH BIREFRINGENCE

Edwin H. Land, Boston, and Cutler D. West, Cambridge, Mass., assignors to Polaroid Corporation, Dover, Del., a corporation of Delaware Application May 4, 1939, Serial No. 271,816

5 Claims. (Cl. 88—65)

This invention relates to a sheet or film of polyvinyl alcohol having high birefringence; to such a sheet having relatively low water permeability, or relative insensibility to heat.

Objects of the invention are to provide a sheet of polyvinyl alcohol, the molecules of which are substantially oriented, which has low permeability, to water, which is but slightly affected by heat, which shows high birefringence, which retains its properties even though later heated to relatively high temperatures, which may be easily laminated to glass and other transparent elements, and which is generally insoluble in common plasticizers for organic plastics, and in organic solvents.

Another object of the invention is to provide a process for the production of a sheet of polyvinyl alcohol having some or all of the properties described.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the following detailed disclosure, and the scope of the application of which will be indicated in the claims.

Figure 1:
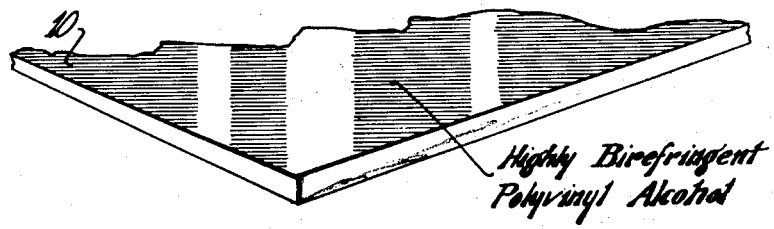
Figure 2:
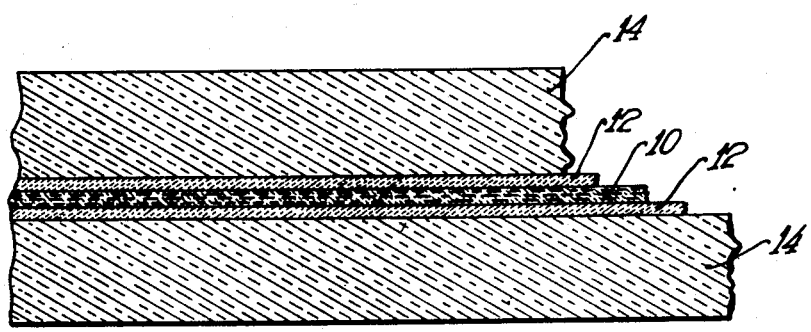

For a fuller understanding of the nature and objects of the invention, reference should be had to the accompanying drawing, in which:

Fig. 1 represents a diagrammatic representation of one form of the invention; and Fig. 2 represents diagrammatically a sectional view of a modified form of the invention.

Polyvinyl alcohol, when suitably treated, has been found to be an excellent material for many purposes. When stretched, so that its long molecules are substantially oriented, it is admirably adapted as a new material for use in the manufacture of light-polarizers. The stretched sheet of oriented polyvinyl alcohol shows high birefringence, and is thus useful in advertising devices, displays, and scientific apparatus employing material showing such birefringence, for example in devices and apparatus employing polarized light with birefringent material for the production of color effects and the like. Furthermore, the birefringence of the stretched sheet of polyvinyl alcohol is easily controlled and may be altered by altering the degree of stretch or extension to which the sheet has been subjected.

Sheets of polyvinyl alcohol formed, for example, by a casting process and then dried, or by extrusion, may be easily stretched by heating and extending the sheet in a desired direction. Where the stretch is substantial, for example where the material has been extended from five to eight times its initial length, the molecules of the sheet become oriented to substantial parallelism. For some purposes this is a preferred condition. Such a sheet, for example, is admirably adapted for use in the manufacture of light-polarizing sheets or films. It has furthermore a relatively high birefringence. The birefringence of such a stretched sheet may exceed, for example, .025. Under these circumstances the index of refraction of the sheet for light vibrating in a predetermined direction may approximate 1.56 and the index of refraction for light vibrating at right angles to said direction may approximate 1.526. Such a sheet has, also, substantially the optical properties of a uniaxial crystal having its optic axis in the plane of the sheet.

For other purposes, for example, where a smaller birefringence is desired, a lesser stretch may be preferred, for example a stretch of from less than 50% to the degree previously specified may be adequate.

Polyvinyl alcohol is ordinarily highly permeable to water, and if a stretched sheet of polyvinyl alcohol is immersed for even a short period in water, the sheet shows a tendency to return to its initial shape with a corresponding loss in orientation of the molecules of the sheet and in its birefringence. If, however, the stretched sheet is subjected to continued heating at the same temperature at which it was stretched, or even at other temperatures, it gradually loses much of its permeability to water and much of its sensitivity to heat. If, for example, a sheet of stretched polyvinyl alcohol is heated at a temperature of approximately 130° C. until the polymerization of the polyvinyl alcohol has substantially progressed, the product is relatively impermeable to water as compared with the initial permeability of the sheet, and the sheet does not tend to lose its stretch on reheating, even at temperatures somewhat in excess of that at which it was originally stretched and at which the further polymerization took place.

It is to be understood that the continued heating of the sheet at other temperatures for different periods may result in a product possessing properties similar to those described. For example, heating for shorter periods at temperatures as high as 170° C. has proved satisfactory.

The product of the present invention is generally insoluble in commercial plasticizers for organic plastics, such as dibutyl phthalate, dibutyl sebacate, triglycoldihexoate, etc., as well as in a large number of organic solvents, such as acetone, ethyl acetate, ethylene dichloride, etc., and it may be easily laminated to glass and to other plastics, such as a sheet of unstretched polyvinyl alcohol, cellulose acetate or the like, without loss of its optical properties, either by direct bonding or by sandwiching between resinous adhesive layers, usually plasticized, such as methyl methacrylate, vinyl acetate, incomplete polyvinyl acetal, etc.

Such a lamination is shown diagrammatically in Fig. 2 in which 10 represents a sheet of highly birefringent polyvinyl alcohol, 12 represents the bonding material or adhesive, and 14 the outer layers of the lamination, for example glass sheets.

The term "sheet" as used herein shall be understood as including films, deposited layers, coatings and the like, either with or without suitable supporting elements and whether or not comprising part of a lamination.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

High permeability to water, as that expression is used herein, shall be deemed to imply that the material may be easily swelled by water.

Reference herein to the melting point of polyvinyl alcohol shall be understood as referring to the temperature at which the material becomes so soft that it does not retain its molecular orientation when stretched in the manner herein described.

It is also to be understood that reference to polyvinyl alcohol shall be deemed to include plasticized as well as unplasticized polyvinyl alcohol. Suitable plasticizers may be employed in quantities, preferably however such that the sheet does not become too soft to hold its shape and form when stretched. Glycerine, formamid and ethylene glycol are representative suitable plasticizers. They may be employed in quantities at least up to 10% by weight of the polyvinyl alcohol.

It is also to be understood that the following claims are intended to cover all the generic and specific features of the invention herein described, and all statements of the scope of the invention which, as a matter of language, might be said to fall therebetween.

Having described our invention, what we claim as new and desire to secure by Letters Patent is:

1. A sheet of polyvinyl alcohol having birefringence greater than .03 and having its molecules oriented to substantial parallelism.

2. A sheet of polyvinyl alcohol having a birefringence between .025 and .035 and having its molecules oriented to substantial parallelism.

3. A sheet of polyvinyl alcohol having its molecules oriented to substantial parallelism in the plane of said sheet and having an index of refraction for light vibrating in a predetermined direction of approximately 1.56 and having an index of refraction for light vibrating perpendicularly to said direction of approximately 1.526.

4. A sheet of polyvinyl alcohol having birefringence greater than .025 having its molecules oriented to substantial parallelism in the plane of the sheet and having relatively low water permeability.

5. A lamination comprising a sheet of polyvinyl alcohol having its molecules oriented to substantial parallelism in the plane of the sheet and having birefringence greater than .025 and bonded to a transparent supporting sheet.

EDWIN H. LAND.
CUTLER D. WEST.